United States Patent [19]

Niese et al.

[11] 4,040,457
[45] Aug. 9, 1977

[54] AUTOMATIC OPENING OF JUICE OUTFLOW CONDUIT IN RESPONSE TO DETECTION OF CONTAINER, WITHOUT PHYSICAL CONTACT

[75] Inventors: Karl Niese, Kronberg; Eckhard Hundhausen, Westerland, both of Germany

[73] Assignee: Braun Aktiengesellschaft, Frankfurt am Main, Germany

[21] Appl. No.: 624,206

[22] Filed: Oct. 21, 1975

[30] Foreign Application Priority Data

Oct. 22, 1974 Germany .............................. 2450059

[51] Int. Cl.² .............................................. B65B 3/06
[52] U.S. Cl. .................................. 141/361; 137/608; 137/637.1; 250/222 R
[58] Field of Search ................................. 141/351–362, 141/140–143, 156–162; 250/221, 222 R; 137/608, 637.1

[56] References Cited

U.S. PATENT DOCUMENTS

| | | | |
|---|---|---|---|
| 3,107,705 | 10/1963 | Isserstedt | 141/361 |
| 3,398,805 | 8/1968 | Wauer | 141/361 |
| 3,668,479 | 6/1972 | Weston et al. | 141/360 |

FOREIGN PATENT DOCUMENTS 1,043,125   11/1958   Germany ........................ 141/360

*Primary Examiner*—Houston S. Bell, Jr.
*Attorney, Agent, or Firm*—Michael J. Striker

[57] ABSTRACT

A juice dispensing apparatus, particularly a household tabletop juicer or juice centrifuge, has a juice outflow conduit. A glass or other container is placed below the outlet of the conduit when it is to be filled and is removed therefrom when it is sufficiently filled. The outlet of the juice outflow conduit is automatically opened and closed in response to the generation of opening and closing command signals, respectively. The presence of a container below the outlet of the juice outflow conduit is detected without physically contacting the container. An opening command signal is generated in response to the detection of the placement of a container below the outlet of the juice outflow conduit. A closing command signal is generated in response to the detection of the removal of a container from below the outlet of the juice outflow conduit.

14 Claims, 2 Drawing Figures

AUTOMATIC OPENING OF JUICE OUTFLOW CONDUIT IN RESPONSE TO DETECTION OF CONTAINER, WITHOUT PHYSICAL CONTACT

BACKGROUND OF THE INVENTION

The invention relates to juice dispensing apparatuses, particularly household tabletop juicers and juice centrifuges, of the type having a juice outflow conduit below the outlet of which a glass or other container is manually placed for filling the container with juice and then manually removed when sufficiently filled.

During the operation of a fruit juice squeezer or juice centrifuge, containers, e.g., glasses, jars, or the like, which have been sufficiently filled with juice will be repeatedly replaced by containers which are yet to be filled. It frequently happens that, during the time interval between the removal of one container from below the outlet of the juice outflow conduit and the placement of the next container, juice will be discharged onto the tabletop upon which the fruit juice squeezer or juice centrifuge is standing. If the table is not covered by a tablecloth, then in general the housewife can easily enough wipe off the juice from the tabletop using a sponge, or the like. On the other hand, if the tabletop is covered by a tablecloth, the housewife usually cannot avoid having to later wash the tablecloth to remove the juice stains. In either case, the housewife is burdened will additional work.

Juice may be undesirably discharged from the outlet of the juice outflow conduit onto the tabletop or countertop in situations other than those involving the replacement of a filled container with an empty one. For example, during the filling of one container, it may happen that the juice centrifuge due to non-uniform feeding of fruit may be coated on the inside with layers of fruit juice residue of varying thickness so as to cause a rotary imbalance of the rotating components of the juice centrifuge. As a result of such imbalance, the tabletop centrifuge may vibrate sufficiently to cause it to drift away from the container being filled.

Fluid dispensing apparatuses are already known which will not dispense fluid until a container is positioned directly below the outlet of the fluid outflow conduit. These apparatuses are provided with a special recessed support onto which the jar or glass to be filled must be placed. One disadvantage of this expedient is that the shape and size of the recess into which the container must be placed limits the sizes and shapes of containers which can be filled. Additionally, it is not possible to place the container to be filled directly upon the tabletop and countertop and then merely push it towards the filling location; instead, the container must be lifted off the tabletop or countertop and then lowered into position in the recess of the support, the support being rigid with the juice dispensing apparatus. This is less comfortable a manipulation than simply pushing the container towards the tabletop juicer.

Federal Republic of Germany Offenlegungsschrift No. 1,454,213 discloses a dispensing valve for the supply tank of a coffee-dispensing machine so designed that it is unnecesary when operating the dispensing machine to actually place one's hand on an activating member for the dispensing valve. The valve is provided with a valve member to which is connected a valve rod at whose lower end there is provided an activating member. The activating member is so designed as to be lifted by a coffee cup pushed underneath the supply tank of the dispensing apparatus. When the activating member is thusly lifted, the valve opens and coffee is dispensed. However, this known dispensing apparatus involves physical contact of the container to be filled, namely the physical contact necessary to displace the activating member.

Federal Republic of Germany Offenlegungsschrift No. 2,119,993 discloses a coffee-dispensing apparatus in which coffee cups are transported through a filling station of the dispensing apparatus. A feeler is disposed above the conveyor for the coffee cups and is operative, upon making contact with a coffee cup placed on the conveyor, for generating an electrical signal. This electrical signal causes the conveyor to advance a distance corresponding to the spacing between the cup and the dispensing nozzle. This arrangement, likewise, involves physical contact of the container to be filled, inasmuch as the coffee cups must mechanically contact the feeler.

Federal Republic of Germany Pat. No. 95,969 discloses an arrangement for centrifuges for the separate dispensing of different syrups, by means of which the different syrups, while they are still in the centrifuge and before they are mixed with each other or one another, are separated by means of a device specially constructed for such purpose. With this arrangement, it is true that there is present a valve by means of which the dispensing outlet can be opened and closed; however, this valve must be activated by hand. Accordingly, with this arrangement likewise, the dispensing outlet is not opened and closed in response to placement and removal of a container to be filled in a way not involving physical contact with the container or manual activation by the user.

Finally, Federal Republic of Germany Offenlegungsschrift No. 1,952,061 discloses a mixing and dispensing apparatus capable of combining measured quantities of at least two liquid components and then dispensing the combination into a container. This apparatus is particularly adapted for mixing components of soup and then dispensing the soup in individual portions. The apparatus is capable of dispensing a portion of soup into a bowl located under the outlet of the soup outflow conduit. There is provided an electrical detecting arrangement operative for detecting the presence or absence of a bowl and, in the event the absence of a bowl is detected, preventing operation of the apparatus. The detecting arrangement is comprised of a signal transmitter and a cooperating, oppositely positioned signal receiver. The positions of the transmitter and receiver are such that the apparatus will not operate unless a bowl is located intermediate the transmitter and receiver. Because of the particular relative positions of the transmitter and receiver in this known apparatus, the detector arrangement is unable to detect the fact that a bowl being filled has drifted or wandered from the proper filling location, for example due to vibration of the tabletop or other support, until such time as the bowl has moved completely out of the detecting beam between the transmitter and receiver. Accordingly, the detecting arrangement will continue to register the presence of a bowl even though only the outermost rim portion of the bowl is still located within the detecting beam, with part of the soup being dispensed into the bowl and part of the soup being spilled over the rim.

SUMMARY OF THE INVENTION

Accordingly, it is a general object of the invention to provide a juice dispensing apparatus, particularly a household tabletop juicer or juice centrifuge, so designed that juice will be dispensed when but only when the container to be filled has been placed as exactly as possible in a proper positon for filling, but without the presence of structure which would interfere with the pushing of the container into the proper filling positon and increase the complexity of the manipulation involved in moving the container into the proper filling position.

This object, and others which will become more understandable from the description, below, of preferred embodiments, can be met, according to one advantageous concept of the invention, by making use of a detector which need not physically contact the container to be filled to determine the presence or placement of such a container. The advantage of avoiding physical contact with the container is that it becomes possible to avoid the presence of structure which might interfere with or complicate the placement of the container in the proper position.

According to a more specific concept of the invention, the detector not requiring physical contact with the container is comprised of a signal transmitter and a cooperating signal receiver. Advantageously, the signal is transmitted towards the location which a container would occupy if it is properly located below the outlet of the juice outflow conduit, and the reflection of the signal back from the container, if any container is present, is detected. The signal can be a light signal, whether visible or invisible, a sound signal, whether audible or inaudible, a pressure signal, or even an electrical, magnetic or electromagnetic signal.

According to one advantageous concept of the invention, the transmitted signal is a pressure signal, established by using a rebound nozzle to direct a stream of gas towards the location at which a container would be properly placed. The back-reflected gas, if any, is detected using a membrane detector cooperating with for example an electrical switch to generate an electrical signal indicative of the presence or absence of a container in the proper filling position.

A particular object of the invention is the quick activation and deactivation of the means for opening and closing the outlet of the juice outflow conduit in response to placement and removal of a container. As a result, it is virtually assured that no juice will be spilled onto the tabletop or countertop upon removal of a container being filled.

Another advantage of a number of the embodiments disclosed is that the position which a container must occupy to cause juice to be dispensed is established by a cooperating transmitter and receiver located both to the same side of the container, instead of being located at opposite sides of the container. The transmitter and receiver can indeed be located virtually coincident. This has the advantage that the initaition of dispensing can be made dependent not only upon the presence of a container in the transmitted signal beam, but can be made additionally dependent upon the closeness of the container to the transmitter-receiver combination. This may under many circumstances be a more advantageous and precise form of automatic control than electric-eye control, or other forms of control, where the dispensing is intitiated when the detecting beam is interrupted, irrespective of where the container is relative to the ends of the beam. This characteristic is obtained even where a receiver discrete from the transmitter is not employed by where, instead, the functions of the transmitter and receiver are combined. For example, if cooling air is sucked into the interior of the juicer housing through a cooling air inlet, and if the cooling air inlet is so located as to be partially blocked by a properly placed container, there will be established a relationship between the underpressure in the stream of air being sucked into the juicer housing, on the one hand, and the presence or absence of the container in the proper position, on the other hand. The underpressure stream extending outwardly away from the cooling air inlet can be considered a transmitted signal, and the reaction of a properly placed container located in this stream constitutes the equivalent of a reflection of such signal, in the sense that a characteristic of the signal (the magnitude of the underpressure) is varied in dependence upon the presence of a container in the proper position. Such variation can be detected by a suitable detector, set to an appropriate threshold value, and used to control the automatic opening and closing of the outlet of the juice outflow conduit. It will be appreciated that such an arrangement constitutes the equivalent of a combined transmitter and receiver. Expressed in other words, such an arrangement constitutes a transmitter which transmits a signal, with the container itself serving to produce a reaction back upon the transmitter such as to modify the operation of the transmitter, and this modification of transmitter operation can in turn be detected at the transmitter by a suitable detector. For example, instead of the transmitter transmitting an underpressure beam (an inflow stream) as in the example just mentioned, the transmitter may be an inductive transmitter operative for establishing a magnetic field. If the container is in part ferromagnetic, then as the ferromagnetic part of the container is moved into the proper position relative to the transmitter it will produce a reaction back upon the field generated by the transmitter. This in turn will modify the voltage and/or current of the transmitter, and such modification can be detected and used to control the automatic opening and closing of the outlet of the juice outflow conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
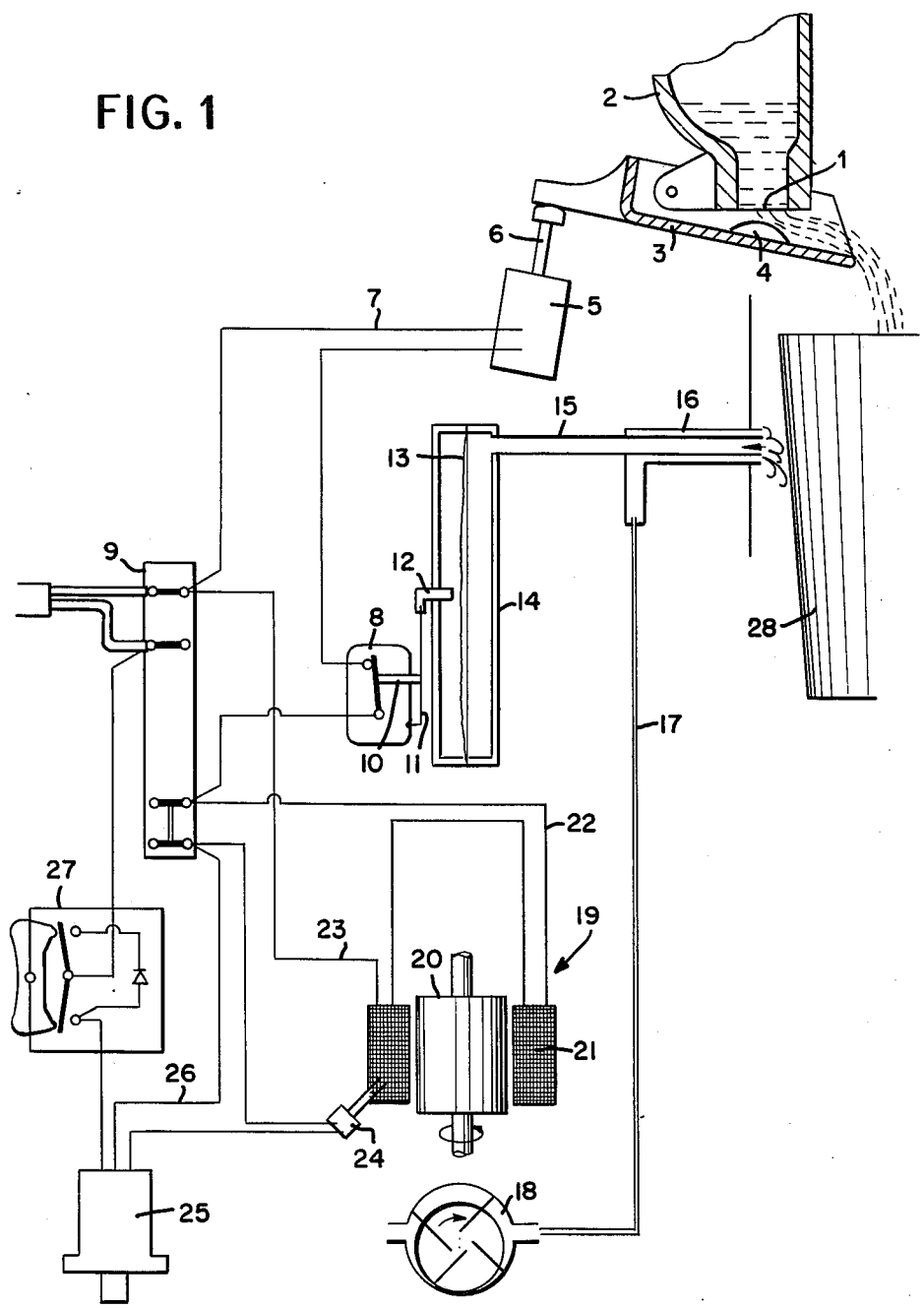
FIG. 1 depicts an exemplary embodiment of the invention operating on a pneumatic-electrical bases.

In FIG. 1, mumeral 1 denotes the outlet of a juice outflow conduit 2 of a household tabletop or countertop juicer or juice centrifuge, or other such juice-dispensing apparatus. The juice outflow conduit 2 is provided with a pivotable stopper member 3 provided with a semispherical plug 4 of rubber or the like which enters into and plugs the outlet 1 of the juice outflow conduit when the stopper member 3 is pivoted into the blocking position thereof. Provided at the back end of the blocking member 3 is a solenoid plunger unit 5 comprised of a stator part and an armature plunger component 6. The stator part is comprised of an activating solenoid whose winding is at one terminal connected directly to the mains voltage connector 9 via conductor 7 and at its other terminal connected to the mains voltage connector 9 via a microswitch 8. The microswitch 8 is activated by a linkage 10 which lies against a leaf spring 11. The leaf spring 11 is in turn connected via a sensing pin 12 to a membrane 13 which is built into a membrane housing 14. When deflected, the membrane 14 will move sensing pin 12, deflect the leaf spring 11, move the linkage rod 10 and thereby open or close the microswitch 8.

Communicating with the interior of the membrane housing 14 is a conduit 15 which in turn is surrounded by a pipe 16. Pipe 16 is connected via a tube 17 to the output of a sliding-vane pump 17. Sliding-vane pump 17 is driven by an electromotor 19 of which there is shown in the drawing only the motor rotor 20 and the stator winding 21. The supply of electrical energy to the motor is effected via conductors 22, 23 connected to the mains voltage connector 9. A heat sensor 24 is located in the stator winding 21 and is electrically connected to both the mains voltage connector 9 and to a safety device 25. Safety device 25 is likewise connected to the mains voltage connector 9, i.e., via the conductor 26 and via a switch 27. Switch 27 is manipulated by the user device for manually effecting the initiation and termination of the operation of the juicer or juice centrifuge.

Located below the outlet of the juice outflow conduit is a glass or other container 28 to be filled with fruit juice. Preferably, the tabletop or countertop juicer or juice centrifuge is so designed that the container 28 to be filled rests directly upon the same tabletop or countertop as does the juicer or juice centrifuge itself; i.e., preferably, the container 28 does not have to be lifted above the tabletop and then stood on a ledge or other support structure of the juice-dispensing apparatus located below the outflow conduit. In this way, the container to be filled with fruit juice can be moved into the proper position by simply sliding it on the tabletop or countertop towards the juicer, without having to lift it off the tabletop and then place it down again.

The operation of the apparatus shown in FIG. 1 is as follows:

It will be initially assumed that the outlet 1 of the juice outflow conduit 2 is closed; i.e., the blocking member 3 is in the upwardly pivoted position in which the rubber stopper 4 plugs closed the outflow conduit outlet. In addition, it is assumed that the manual on-off switch 27 is closed. In this situation, the sliding-vane pump 18 continuously drives a stream of air through the tube 17 into the pipe 16. If no container 28 is present beneath the outlet of the juice outflow conduit, then the stream of air emerging from pipe 16 will encounter no flow resistance, and the outlet of the juice outflow conduit will stay closed.

If now the container 28 is moved into the proper position beneath the outlet of the juice outflow conduit, then a part of the air stream discharged from pipe 16 will be reflected back from the container 28 and into the pipe 15. As a result, there will be established in the right half of the membrane housing 14 an overpressure causing the membrane 13 to be deflected leftwardly. The sensing pin 12 is accordingly moved by the membrane 13 and deflects the leaf spring 11. The deflection of the leaf spring 11 causes the linkage rod 10 to close the microswitch 8. As a result, the solenoid plunger unit 5 becomes connected to voltage, and the plunger thereof is pushed upwards. The plunger 6 tilts the blocking member 3 about its pivot axis and thereby causes the outlet of the juice outflow conduit to be opened. Juice can now flow into the container 28. The blocking member 3 can be normally maintained in its aforementioned blocking position by a (non-illustrated) biasing spring, or the equivalent.

If the container 28 is now removed, before or after it is completely filled, or if the juicer or juice centrifuge moves out of its original position, the pressure exerted upon membrane 13 will drop. When the pressure drops below a certain preselected threshold value, which can be established by suitable selection of the dimensions of the membrane and its prestressing if any, the linkage rod 10 is moved back to its starting position, thereby causing the microswitch 8 to open. As a result, voltage is removed from the solenoid plunger unit 5 and the plunger 6 returns to its original position. This causes the blocking member 3 to pivot upwards back towards the blocking position wherein the rubber stopper 4 plugs closed the outlet 1 of the juice outflow conduit 2.

The switching hysteresis of this arrangement can be so selected, by suitable matching of the membrane 13 and the microswitch 8, as to ensure that the outlet of the juice outflow conduit is closed with sufficient quickness, so that if a container 28 is removed with ordinary quickness the outlet of the juice outflow conduit will actually be plugged closed while at least part of the container 28 is still below the outlet.

The heat sensor 24 is operative for causing safety device 25 to disconnect the electromotor from power in response to motor overheating. Such overheating could occur, for example, if the motor were blocked as a result of overloading of the juicer or juice centrifuge.

A modification of the embodiment of FIG. 1, which also operates on a pneumatic-electrical bases, could involve utilization of the stream of cooling air anyway established in many juicers or juice centrifuges for motor cooling purposes. Thus, if the rotor of the motor is provided with fan fins to generate suction, and if such suction is used to draw cooling air into the housing of the juice through a cooling air suction inlet, then the cooling air suction inlet could be located in a position corresponding to that of the rebound nozzle arrangement 15, 16 of FIG. 1. If a container 28 is located in the proper position for filling, then it would partially obstruct the inflow of air into the cooling air suction inlet. This would cause a build-up of the underpressure in the tube leading from such inlet to the motor chamber of the housing, and such underpressure build-up could be detected, for controlling automatically the opening and closing of the outlet of the juice outflow conduit. The underpressure build-up or other corresponding variation in the cooling air inflow could be detected, for example, using an airflow-sensing switch device.

Figure 2:
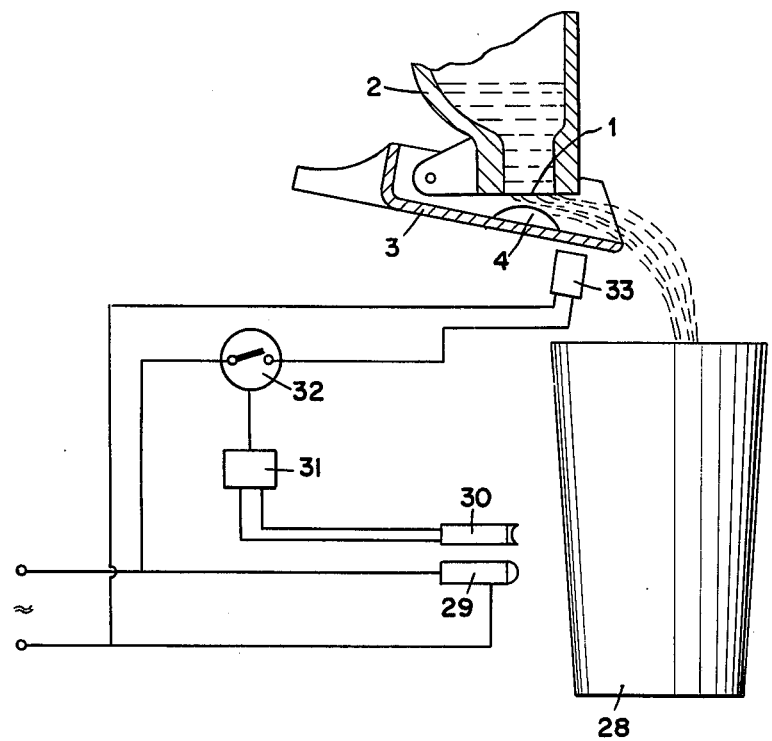
FIG. 2 depicts another exemplary embodiment of the invention operating on an optical-electrical basis.

FIG. 2 depicts another embodiment of the invention, operating this time on an optical-electrical basis. In this embodiment use is made of a transmitter 29 which transmits light, preferably in the ultraviolet or infrared spectral region. In the event that no container 28 is present beneath the outlet of the juice outflow conduit, this transmitted light will be dispersed into empty space. On the other hand, if a container 28 is properly positioned for receiving of fruit juice, then a certain fraction of the light will be reflected back from the surface of the container 28 and impinge upon the photoelectric light receiver 30. The phtoelectric light receiver 30, which could for example be a photocell, generates an electrical signal which it applies to a Schmitt trigger 31. The Schmitt trigger in turn will generate an output signal whenever the signal applied thereto exceeds a preselected threshold value. The establishment of such a threshold value to be exceeded is necessary because the infrared and ultraviolet light components in natural daylight might otherwise be capable of activating the automatic arrangement, if they were not positively excluded by the establishment of a threshold value high enough to assure that the infrared or ultraviolet light intensity needed to actuate the arrangement is greater than occurring in natural daylight. If the Schmitt trigger 31 is activated, in response to exceeding of the preselected intensity threshold value, then it causes a switching or gating stage 32 to transmit voltage to an electromagnet 33. The switching or gating stage 32 can be essentially comprised of a switching transistor, thyristor or relay, whereas the electromagnet 33 can be of conventional design and operative when energized for attracting and thereby pulling down the blocking member 3.

If use is made of a container having a metallic lug or other part, then the means for ascertaining the placement and removal of the container can be essentially comprised of an inductive proximity detector. Such a proximity detector is comprised of an oscillator of variable inductive coupling and a cooperating rectifier circuit supplied by a separate, fixedly coupled winding. The air gap between the oscillator and feedback winding is accessible from outside the housing of the juicer or juice centrifuge through a slit in such housing, so that the coupling can be varied in response to the presence of metallic material. For example, if a metallic lug of a container is moved into the slit, then if the lug assumes a definite position, the coupling of the circuit will undergo a change, due to the dissipation of electrical energy in the metallic lug as a result of the flow of eddy currents, and the oscillator oscillations will break down. Such oscillation breakdown can be detected by the disappearance of the DC output voltage at the output of the aformentioned rectifier circuit.

Instead of an inductive proximity detector, use could be made of other proximity detectors, such as magnetic proximity detectors (e.g., Hall generator devices and the like), capacitive proximity detectors, and others.

It will be understood that each of the elements described above, or two or more together, may also find a useful application in other types of constructions differing from the types described above.

While the invention has been illustrated and described as embodied in a tabletop or countertop household juicer or juice centrifuge, it is not intended to be limited to the details shown, since various modifications and structural changes may be made without departing in any way from the spirit of the present invention.

Without further anaylsis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a juice dispensing apparatus, particularly a household tabletop juicer or juice centrifuge, of the type having a jucie outflow conduit below the outlet of which a glass or other container is placed for filling the container with juice, in combination, first means for opening and closing the outlet of the juice outflow conduit in automatic response to the receipt of opening and closing command signals, respectively; and second means operative for detecting the presence of a container below the outlet of the juice outflow conduit without physically contacting the container and operative for generating an opening command signal in response to the detection of the placement of a container below the outlet of the juice outflow conduit and a closing command signal in response to the detection of the removal of a container from below the outlet of the juice outflow conduit, wherein the second means comprises a signal transmitter operative for transmitting a signal towards the location occupied by a properly positioned container and a signal receiver operative for detecting the presence of a properly positioned container by detecting the reflection of the transmitted signal back from the container.

2. The apparatus defined in claim 1, wherein said transmitter comprises means for directing a stream of gas towards the location which a container occupies when located below the juice outflow conduit, said detector means comprising membrane detector means for detecting the presence of a container at such location by detecting the gas stream rebounding from the container, and means for generating an opening command signal in response to the detection of the rebounding gas stream.

3. The apparatus defined in claim 2, wherein the means for directing a stream of gas comprises a source of pressurised gas and a rebound nozzle arrangement connected to the source and oriented to direct a stream of gas towards the aforementioned location.

4. The apparatus defined in claim 2, wherein the means for generating an opening command signal in response to the detection of the rebounding gas stream comprises an electric switch mechanically connected to the membrane of the membrane detector means and electrically connected to the first means for supplying the opening command signal to the latter in the form of an electrical signal.

5. The apparatus defined in claim 1, wherein the first means comprises a stopper member pivotably mounted for movement between a blocking position in which it blocks the outlet of the juice outflow conduit and an unblocking position in which it unblocks the outlet of the juice outflow conduit and electromagnetic moving means connected to the second means for receipt of the command signals and operative in response to the command signals for moving the stopper member between the blocking and unblocking positions thereof.

6. The apparatus defined in claim 3, the juice dispensing apparatus including an electric drive motor, wherein the source of pressurized gas comprises a sliding-vane pump coupled to and driven by the electric drive motor of the juice dispensing device and having an outlet connected to the rebound nozzle.

7. The apparatus defined in claim 1, wherein the transmitter comprises means for emitting an ultrasonic sound signal towards the location occupied by containers placed below the outlet of the juice outflow conduit, and wherein the detector means comprises means for detecting the presence of a container at such location by sensing the reflection of the ultrasonic signal back from the container.

8. The apparatus defined in claim 1, wherein the signal transmitter and the signal receiver are located to the same side of a container when such container is properly positioned.

9. The apparatus defined in claim 8, wherein the signal transmitter and signal receiver are located approximately coincident with each other.

10. In a juice dispensing apparatus, particularly a household tabletop juicer or juice centrifuge, of the type having a juice outflow conduit below the outlet of which a glass or other container is placed for filling the container with juice, in combination, first means for opening and closing the outlet of the juice outflow conduit in automatic response to the receipt of opening and closing command signals, respectively; and second means operative for detecting the presence of a container below the outlet of the juice outflow conduit without physically contacting the container and operative for generating an opening command signal in response to the detection of the placement of a container below the outlet of the juice outflow conduit and a closing command signal in response to the detection of the removal of a container from below the outlet of the juice outflow conduit, wherein the second means comprises a source of light having a limited spectral range and a cooperating light detector operative for detecting light having the same spectral range, the source and detector being so positioned that a container placed below the outlet of the juice outflow conduit will block the light from the source from reaching the detector.

11. In a juice dispensing apparatus, particularly a household tabletop juicer or juice centrifuge, of the type having a juice outflow conduit below the outlet of which a glass or other container is placed for filling the container with juice, in combination, first means for opening and closing the outlet of the juice outflow conduit in automatic response to the receipt of opening and closing command signals; respectively; and second means operative for detecting the presence of a container below the outlet of the juice outflow conduit without physically contacting the container and operative for generating an opening command signal in response to the detection of the placement of a container below the outlet of the juice outflow conduit and a closing command signal in response to the detection of the removal of a container from below the outlet of the juice outflow conduit, wherein the second detecting means comprises an inductive proximity detector operative for detecting the presense of a container having at least one metallic portion.

12. The apparatus defined in claim 11, wherein the limited spectral range is outside the spectral range of visible light.

13. In a juice dispensing apparatus, particularly a household tabletop juicer or juice centrifuge, of the type having a juice outflow conduit below the outlet of which a glass or other container is placed for filling the container with juice, in combination, first means for opening and closing the outlet of the juice outflow conduit in atuomatic response to the receipt of opening and closing command signals, respectively; and second means operative for detecting the presence of a container below the outlet of the jucie outflow conduit without physically contacting the container and operative for generating an opening command signal in response to the detection of the placement of a container below the outlet of the juice outflow conduit and a closing command signal in response to the detection of the removal of a container from below the outlet of the juice outflow conduit, wherein the second means comprises a transmitter for transmitting a signal towards the location occupied by a properly positioned container and means for detecting the effect of the presense of a container at such location upon the operation of the transmitter.

14. The apparatus defined in claim 13, the juice dispensing apparatus being provided with a cooling air inlet and means for drawing cooling air in through the cooling air inlet and into the interior of the juice dispensing apparatus and constituting said transmitter, the cooling air inlet being so located that when a container is placed below the outlet of the juice outflow conduit the container alters the underpressure of the stream of cooling air, and wherein the detector means comprises means for detecting the placement of a container below the outlet of the juice outflow conduit and the removal of a container from below the outlet of the juice outflow conduit by detecting the corresponding changes in the underpressure of the stream of cooling air.

* * * * *